United States Patent [19]
Nishimura et al.

[11] Patent Number: 5,230,519
[45] Date of Patent: Jul. 27, 1993

[54] HYDRAULICALLY OPERATED POWER TRANSMISSION APPARATUS

[75] Inventors: Sadanori Nishimura; Hiroshige Makita; Makiro Ishimoto; Atsuyoshi Kawai; Makoto Ninomiya, all of Saitama, Japan

[73] Assignee: Honda Giken Kogyo Kabushiki Kaisha, Tokyo, Japan

[21] Appl. No.: 450,263

[22] Filed: Dec. 13, 1989

Related U.S. Application Data

[63] Continuation-in-part of Ser. No. 425,362, Oct. 19, 1989, which is a continuation of Ser. No. 155,996, Feb. 16, 1988, abandoned.

[30] Foreign Application Priority Data

| Dec. 13, 1988 | [JP] | Japan | 63-314576 |
| Feb. 28, 1989 | [JP] | Japan | 1-22530[U] |
| Apr. 18, 1989 | [JP] | Japan | 1-45214[U] |

[51] Int. Cl.⁵ .................. F16H 37/06; F16H 57/02
[52] U.S. Cl. .................................. 475/83; 475/206
[58] Field of Search ........... 475/83, 200, 206, 207; 180/337, 344; 417/269, 91, 505, 506

[56] References Cited

U.S. PATENT DOCUMENTS

| 3,074,296 | 1/1963 | Ebert | 475/75 |
| 3,123,975 | 3/1964 | Ebert | 60/443 |
| 3,528,322 | 9/1970 | Schou | 475/75 |
| 3,805,641 | 4/1974 | Hause | 475/83 |
| 3,902,567 | 9/1975 | Pekar, Jr. | 60/469 |
| 4,040,312 | 8/1977 | Tappan et al. | 475/83 |
| 4,111,003 | 9/1978 | Bolinger et al. | 60/469 |
| 4,397,201 | 8/1983 | Mann | 475/83 |
| 4,514,978 | 5/1985 | Buschbom et al. | 60/426 |
| 4,627,237 | 12/1986 | Hutson | 60/487 |
| 4,691,802 | 9/1987 | Ishimori et al. | 180/291 |
| 4,718,301 | 1/1988 | Friedrich | 475/206 |
| 4,815,358 | 3/1989 | Smith | 417/269 |
| 4,862,767 | 9/1989 | Hauser | 475/83 |
| 4,893,524 | 1/1990 | Ohashi et al. | 475/83 |
| 4,903,545 | 2/1990 | Louis et al. | 475/83 |

FOREIGN PATENT DOCUMENTS

| 1800394 | 5/1969 | Fed. Rep. of Germany . |
| 1800636 | 7/1969 | Fed. Rep. of Germany . |
| 2264319 | 7/1974 | Fed. Rep. of Germany . |
| 2406019 | 8/1975 | Fed. Rep. of Germany . |
| 3125123 | 1/1983 | Fed. Rep. of Germany . |
| 2297363 | 8/1976 | France | 475/83 |
| 2610875 | 2/1988 | France . |
| 38-7172 | 5/1963 | Japan . |
| 49-2337 | 1/1974 | Japan . |
| 49-47213 | 12/1974 | Japan . |
| 55-16929 | 2/1980 | Japan . |
| 0152674 | 11/1980 | Japan | 180/344 |
| 60-37654 | 3/1985 | Japan . |
| 60-116082 | 8/1985 | Japan . |
| 61-19158 | 2/1986 | Japan . |
| 61-139821 | 8/1986 | Japan . |
| 61-139822 | 8/1986 | Japan . |
| 61-263834 | 11/1986 | Japan . |
| 63-258220 | 10/1988 | Japan . |
| 2165325 | 10/1984 | United Kingdom | 475/206 |

Primary Examiner—Rodney H. Bonck
Assistant Examiner—Ryan W. Massey
Attorney, Agent, or Firm—Irving M. Weiner; Joseph P. Carrier; Pamela S. Burt

[57] ABSTRACT

A hydraulically operated power transmission apparatus transmits the output power from a power source at a selected speed ratio. The power transmission apparatus includes a casing having an opening in one end thereof, a base plate attached to the end of the casing in covering relation to the opening, the casing and the base plate jointly serving as a transmission case defining a closed space therein, a hydraulic pump having a pump drive shaft adapted to be operatively coupled to the power source, the hydraulic pump being disposed in the closed space, a hydraulic motor having a motor output shaft and drivable by a hydraulic pressure generated by the hydraulic pump, the hydraulic motor being disposed in the closed space, a pair of output shafts extending through the casing and the base plate, respectively, and disposed coaxially with each other, a differential mechanism disposed in the closed space and operable by the motor output shaft, the differential mechanism being coupled to the output shafts. The hydraulic pump, the hydraulic motor, and the differential mechanism are mounted on the base plate. The pump drive shaft, the motor output shaft, and the differential mechanism have ends rotatably supported by the base plate and opposite ends rotatably supported by the casing.

20 Claims, 7 Drawing Sheets

HYDRAULICALLY OPERATED POWER TRANSMISSION APPARATUS

This application is a continuation-in-part of copending U.S. patent application Ser. No. 07/425,362, filed Oct. 19, 1989 which is a file wrapper continuation of U.S. patent application Ser. No. 07/155,966 filed Feb. 16, 1988 now abandoned.

BACKGROUND OF THE INVENTION

1. Field of the Invention

The present invention relates to a hydraulically operated power transmission apparatus having a hydraulically operated transmission mechanism and a differential mechanism.

2. Description of the Relevant Art

Some known power transmission apparatus for use on riding-type working machines such as tractors include a hydraulically operated transmission mechanism having a hydraulic pump and a hydraulic motor which are interconnected by hydraulic passages and operable to continuously vary the transmission ratio or speed reduction ratio.

Power transmission apparatus comprising the hydraulically operated transmission mechanism of the type described above and a mechanical differential are disclosed in Japanese Laid-Open Utility Model Publication Nos. 61(1986)-139821 and 61(1986)-139822 and Japanese Laid-Open Patent Publication No. 63(1988)-258220, for example.

In the power transmission apparatus disclosed in Japanese Laid-Open Utility Model Publication Nos. 61(1986)-139821 and 61(1986)-139822, the hydraulically operated transmission mechanism and the differential mechanism are disposed independently of each other. Since the transmission and differential mechanisms have respective casings, the number of parts used is large, and the power transmission apparatus is large in size.

The power transmission apparatus disclosed in Japanese Laid-Open Patent Publication No. 63(1988)-258220 is also large in size and cannot easily be disassembled and assembled because the pump drive shaft of the hydraulic pump is positioned remotely from the hydraulic motor and extends perpendicularly to the output shaft of the hydraulic motor and the output shaft extending from the differential mechanism.

When the motor vehicle incorporating the above conventional hydraulically operated transmission apparatus runs downhill, the output shaft of the hydraulic motor is forcibly driven by the road wheels of the motor vehicle, applying forces to the swash plate of the hydraulic pump in a direction away from the neutral position. Then, a link mechanism coupled to the swash plate is released from a tension, and the swash plate tends to wobble about its pivot shafts for thereby allowing the speed of the motor vehicle to become unstable.

SUMMARY OF THE INVENTION

It is an object of the present invention to provide a hydraulically operated power transmission apparatus which includes a hydraulic motor, a hydraulic pump, a differential mechanism, and a charging pump that are disposed in a compact arrangement, thus making the apparatus smaller in size, and which can easily be assembled, maintained, and serviced.

According to one aspect of the present invention, a casing and a base plate which covers the casing jointly serve as a transmission case defining a closed space therein. A hydraulic pump, a hydraulic motor, and a differential mechanism are disposed in the closed space. The pump drive shaft of the hydraulic pump, the output shaft of the hydraulic motor, and an output shaft of the differential mechanism have ends rotatably supported by the base plate, whereas the other ends thereof are rotatably supported by the casing.

According to another aspect of the present invention, a cover is attached to an outer surface of the base plate through a sealing member. The cover has a charging pump housing which accommodates an oil charging pump and a seal member providing a seal between the output shaft of the differential mechanism and the transmission case.

A swash plate stabilizer for pushing back the swash plate of the hydraulic pump to a neutral position is provided to prevent the swash plate from wobbling when a motor vehicle incorporating the power transmission apparatus runs downhill.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Like or corresponding parts are denoted by like or corresponding reference numerals throughout views.

Figure 1:
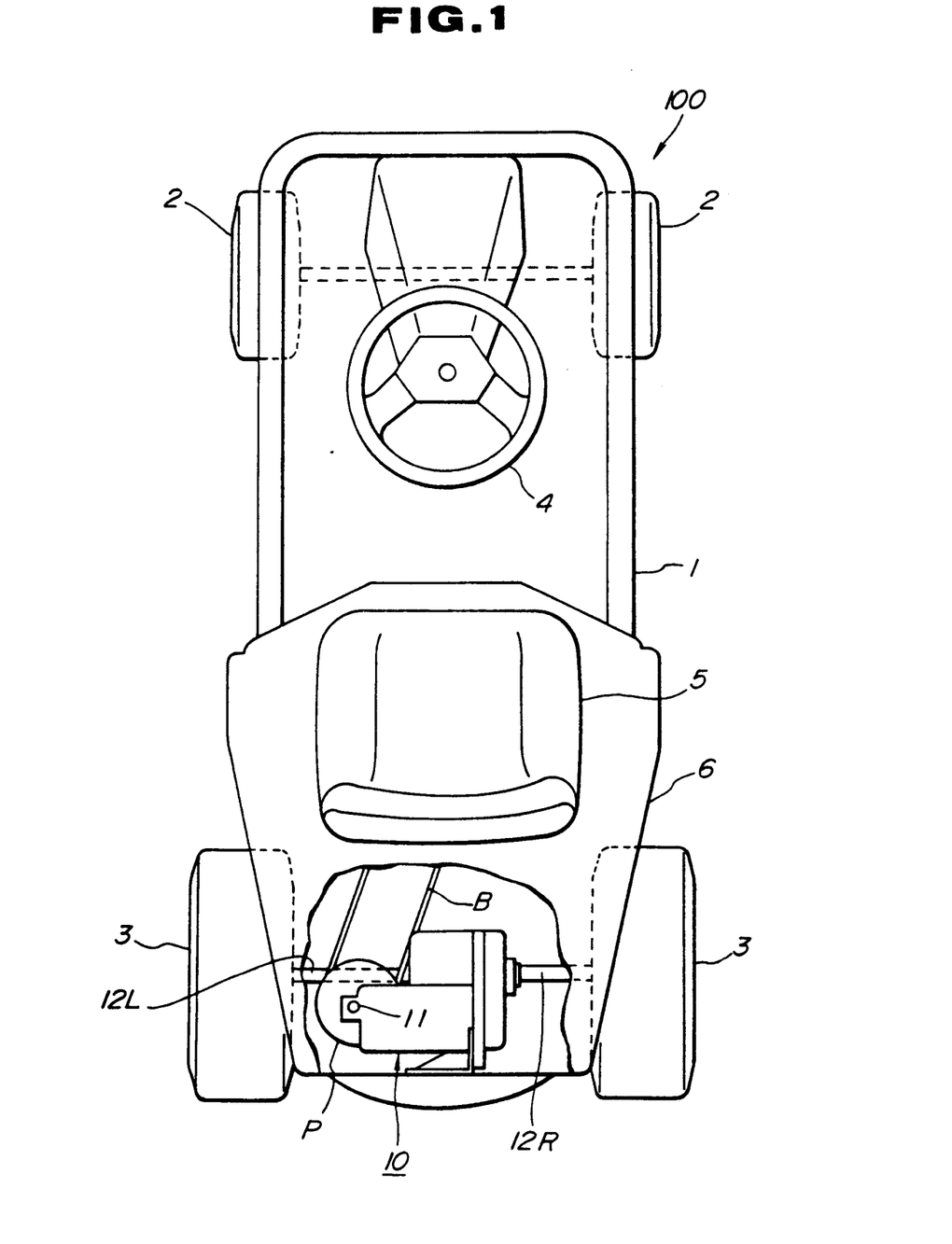
FIG. 1 is a plan view, partly broken away, of a riding-type lawn mowing machine incorporating a hydraulically operated power transmission apparatus according to an embodiment of the present invention.
Figure 2:
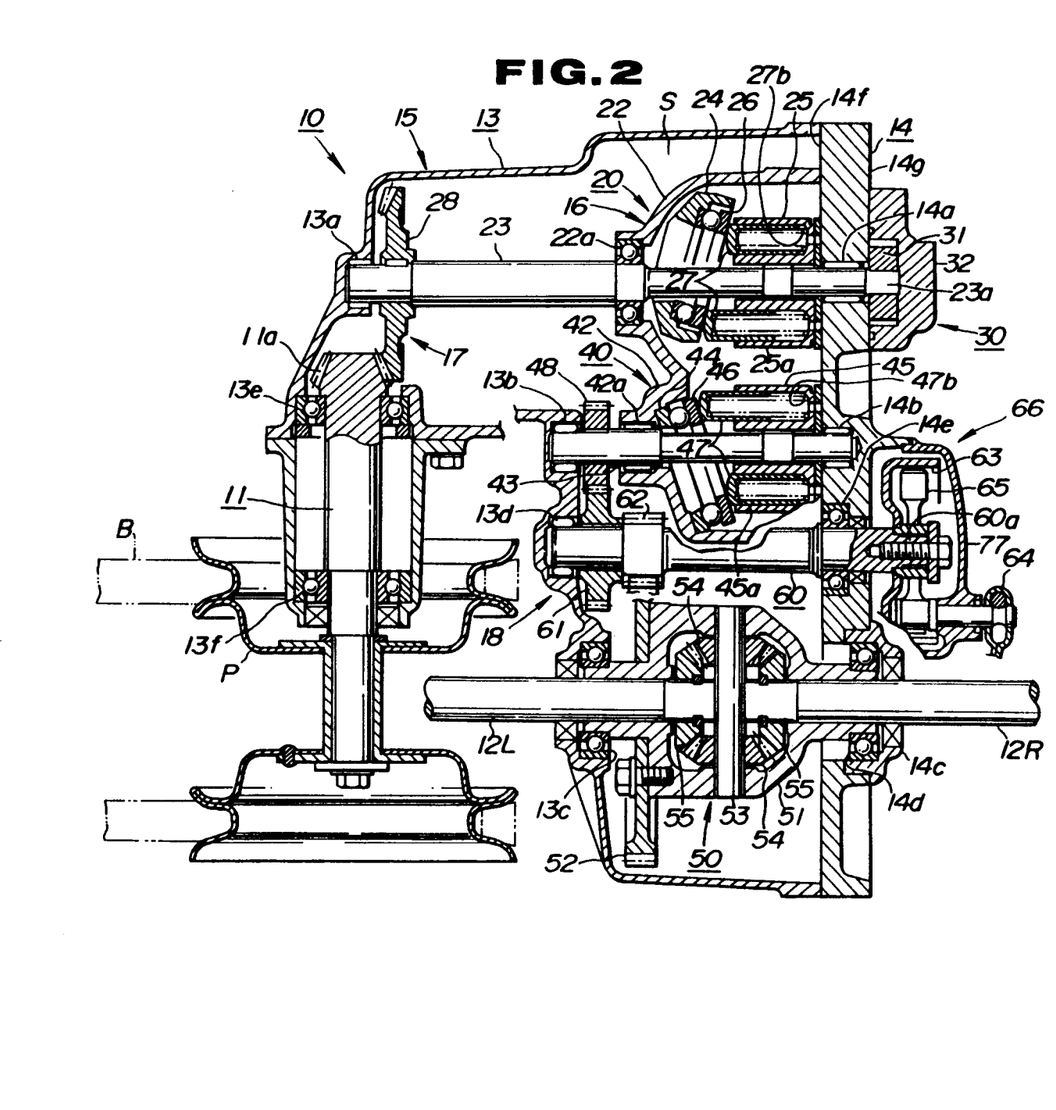
FIG. 2 is an enlarged cross-sectional view of the hydraulically operated power transmission apparatus on the lawn mower shown in FIG. 1.

FIGS. 1 and 2 show a hydraulically operated power transmission apparatus according to an embodiment of the present invention.

As shown in FIG. 1, a riding-type lawn mowing machine 100 includes a frame 1 on which front and rear road wheels 2, 3 are rotatably mounted at front and rear portions thereof. The mowing machine 100 also has a steering wheel 4 on the front portion of the frame 1, and a driver's seat 5 on its central portion. The rear portion of the lawn mower 100 is covered with a body 6 with a hydraulically operated power transmission apparatus 10 disposed therebelow. The power produced by an engine disposed in the body 6 is transmitted by a belt B to a pulley P mounted on an input shaft 11 of the power transmission apparatus 10, which changes the speed of the transmission power and rotates output shafts 12R, 12L to drive the rear road wheels 3.

As illustrated in FIG. 2, the power transmission apparatus 10 has a transmission case 15 comprising a casing 13 having an opening in one side thereof, and a base plate 14 attached to the open side of the casing 13 in closing relation to the opening. The transmission case 15 thus defines a closed space S therein which accommodates a hydraulic pump 20, the hydraulic motor 40, and a differential mechanism 50. The base plate 14 is of a substantially uniform thickness and has a flat inner attachment surface 14f surrounded by the casing 13 and a flat outer attachment surface 14g which is exposed outwardly.

The input shaft 11 is rotatably supported in the casing 13 by bearings 13e, 13f and has one end projecting out of the casing 13 with the pulley P mounted on the projecting end. A bevel gear 11a is fixed to the other end of the input shaft 11 and held in mesh with another bevel gear 28 fixed to an end of a pump drive shaft 23 by a key. The input shaft 11 extends perpendicularly to the pump drive shaft 23. Therefore, rotation of the input shaft 11 is transmitted to the pump drive shaft 23, while the direction of the rotational axis is bent 90° by a direction changing mechanism 17 which comprises the bevel gear 11a, 28.

The hydraulic pump 20 is in the form of a swash-plate variable-displacement axial-piston pump. The hydraulic pump 20 comprises the pump drive shaft 23, a cylinder block 25 splined over the pump drive shaft 23 for rotation therewith, a plurality of cylinders 25a defined in the cylinder block 25 concentrically around the pump drive shaft 23, a swash plate 24 having a thrust bearing 26 and angularly movable, a plurality of pistons 27 fitted respectively in the cylinders 25a and reciprocally movable in abutting contact with the thrust bearing 26 of the swash plate 24, and a pump case 22 housing these pump components and secured to the inner attachment surface 14f of the base plate 14.

The pump case 22 is integral with a motor case 42 (described later), and they jointly serve as an inner case 16.

The pump drive shaft 23 has a lefthand end (as viewed in FIG. 2) rotatably supported in the casing 13 by a bearing 13a, an intermediate portion rotatably supported in the pump case 22 by a bearing 22a, and a righthand end rotatably supported in the base plate 14 by a bearing 14a and projecting as an end 23a out of the base plate 14.

An oil charging pump 30 comprises a trochoid pump having a rotor 31 in the form of a trochoid gear fixedly mounted on the projecting end 23a of the pump drive shaft 23 and a charging pump case 32 mounted on the outer attachment surface 14g of the base plate 14. The oil charging pump 30 supplies working oil to an inlet port (not shown) of the hydraulic pump 20.

The hydraulic motor 40 is in the form of a fixed-swash-plate axial-piston motor. The hydraulic motor 40 comprises the motor case 42 fixed to the inner attachment surface 14f, an output shaft 43 extending through the motor case 42, a swash plate 44 fixedly attached to the motor case 42 at an angle to the axis of the output shaft 43, a cylinder block 45 splined over the output shaft 43 for rotation therewith, and a plurality of pistons 47 fitted respectively in cylinders 45a defined in the cylinder block 45 and reciprocally movable while sliding on a thrust bearing 46 of the swash plate 44. The base plate 14 has hydraulic passages (not shown) defined therein and communicating between the cylinders 25a of the hydraulic pump 20 and the cylinders 45a of the hydraulic motor 40. The hydraulic motor 40 is rotated by a hydraulic pressure produced by the hydraulic pump 20.

The output shaft 43 of the motor 40 has a lefthand end (as viewed in FIG. 2) rotatably supported in the casing 13 by a bearing 13b, an intermediate portion rotatably supported in the motor case 42 by a bearing 42a, and a righthand end rotatably supported in the base plate 14 by a bearing 14b.

The differential mechanism 50 is disposed below the hydraulic motor 40. The differential mechanism 50 is in the form of a mechanical differential which comprises a differential case 51, a spur gear 52 mounted on the differential case 51, a pinion shaft 53 supported by the differential case 51, a pair of pinions 54 mounted on the pinion shaft 53, a pair of side gears 55 held in mesh with the pinions 54, and the output shafts 12R, 12L connected respectively to the side gears 55.

The differential case 51 has a righthand end (as viewed in FIG. 2) rotatably supported by a bearing 14d which is mounted in the base plate 14 by a bearing box 14c, and a lefthand end rotatably supported by the casing 13 by a bearing 13c.

Between the differential mechanism 50 and the hydraulic motor 40, there is disposed a countershaft 60 on which there is fixedly mounted a larger gear 61 held in mesh with a gear 48 fixed to the motor output shaft 43. A smaller gear 62 fixedly mounted on the countershaft 60 is held in mesh with the spur gear 52 of the differential mechanism 50. These gears 48, 61, 62, 52 and the countershaft 60 jointly serve as a speed reducer gear mechanism, i.e., a countershaft transmission mechanism 18. The countershaft 60 is supported by a bearing 13d mounted in the transmission case 13 and a bearing 14e mounted in the base plate 14.

The countershaft 60 has a righthand end (as viewed in FIG. 2) projecting as an end 60a out of the base plate 14, and a brake 66 for braking the countershaft 60 is mounted on the projecting end 60a of the countershaft 60. The brake 66 comprises a brake drum 63 fixed to the projecting end 60a, a brake shoe 65 disposed in the brake drum 63, a link 64 operatively coupled to the brake shoe 65, and a lid 77 housing the brake drum 63 and attached to the outer attachment surface 14g. When the link 64 is angularly moved, the brake shoe 65 is moved radially outwardly into frictional engagement with the brake drum 63 to brake the countershaft 60 against rotation about its own axis.

The brake 66 may be mounted on the motor output shaft 43, rather than on the countershaft 60.

The pump drive shaft 23, the motor output shaft 43, the countershaft 60, and the output shafts 12R, 12L of the differential mechanism 50 lie parallel to each other, with the input shaft 11 extending perpendicularly to these shafts. Only the input shaft 11 and the output shafts 12R, 12L coupled to the rear road wheels 3 project from the hydraulically operated power transmission apparatus 10.

The power transmission apparatus 10 is assembled as follows:

The bearings 14a, 14b are fitted in the base plate 14, and the end 23a of the pump drive shaft 23 is inserted through the bearing 14a whereas the motor output shaft 43 is inserted through the bearing 14b. The inner case 16 is attached to the inner attachment surface 14f of the base plate 14, thus installing the hydraulic pump 20 and the hydraulic motor 40 on the inner attachment surface 14f.

Then, the trochoid gear 31 of the oil charging pump 30 is mounted on the projecting end 23a of the pump drive shaft 23, and the charging pump case 32 is attached to the outer attachment surface 14g of the base plate 14, so that the oil charging pump 30 is completed.

The hydraulic pump 20, the oil charging pump 30, and the hydraulic motor 40 may now be tested for their operation to ascertain whether the hydraulically operated power transmission apparatus composed of the hydraulic passages (not shown) in the base plate 14, the hydraulic pump 20, the hydraulic motor 40, and the oil charging pump 30 operate satisfactorily or not.

Thereafter, the bearing 14e is fitted in the base plate 14, the end 60a of the countershaft 60 is inserted through the bearing 14e, and the brake drum 63 is installed on the projecting end 60a. The lid 70 with the link 64 and the brake shoe 65 coupled thereto is affixed to the base plate 14.

The bearing box 14c with the bearing 14d fitted therein is attached to the base plate 14, and the output shaft 12R of the differential mechanism 50 is inserted through the bearing 14d.

At this time at the latest, the base plate 14 is horizontally held with the inner attachment surface 14f facing upwardly. Now, the pump drive shaft 23, the motor output shaft 43, the output shaft 12L, and the countershaft 60 extend parallel to each other vertically on the base plate 14.

The bevel gear 28 is mounted on the pump drive shaft 23, and the gear 48 is mounted on the motor output shaft 43. The meshing condition between the gear 48 and the larger gear 61 on the countershaft 60 is adjusted, and the meshing condition between the smaller gear 62 on the countershaft 60 and the spur gear 52 is adjusted.

The casing 13 with the input shaft 11 installed thereon is carefully placed over the base plate 14 with the above shafts vertically mounted thereon. The upper ends of the shafts are fitted respectively in the bearings 13a through 13d in the casing 13, after which the casing 13 and the base plate 14 are coupled to each other into the transmission case 15. The power transmission apparatus 10 is now completed.

The differential mechanism 50 and the intermediate transmission mechanism 18 can be inspected and easily serviced when the casing 13 is removed.

The above process of assembling the power transmission mechanism 10 is for illustrative purpose only. The power transmission mechanism 10 may be assembled in any of various different ways.

Operation of the power transmission apparatus 10 will be described below.

Rotative power from the engine is applied from the pulley P to the input shaft 11 to rotate the pump drive shaft 23. The pistons 27 of the hydraulic pump 20 draw oil and feed oil under pressure to the hydraulic motor 40. The oil supplied to the hydraulic motor 40 reciprocally moves the pistons 47 thereof for thereby rotating the motor output shaft 43. At this time, the oil charging pump 30 draws oil from within the transmission case 15 and supplies it through the oil passages in the base plate 14 to the hydraulic pump 20.

The motor output shaft 43 may be selectively rotated, reversed, and stopped by varying the angle of inclination of the swash plate 24 of the hydraulic pump 20.

The rotation of the motor output shaft 43 is transmitted through the countershaft transmission mechanism 18 to the differential mechanism 50, which rotates the output shafts 12R, 12L to move the lawn mower 100 forwardly or rearwardly.

A hydraulically operated power transmission apparatus according to another embodiment of the present invention will be described below with reference to FIGS. 3 through 5.

Figure 3:
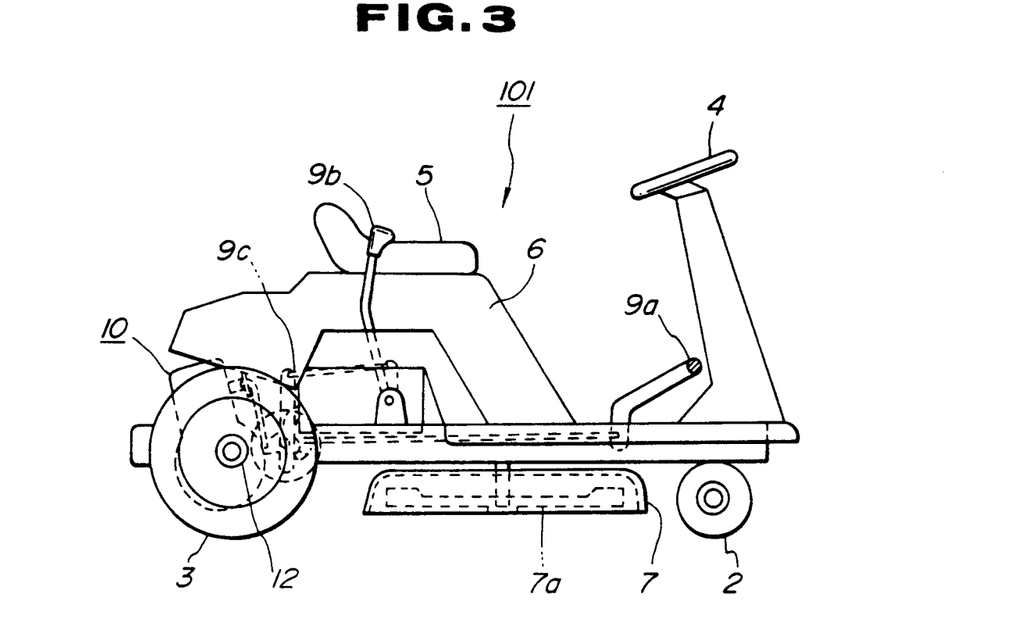
FIG. 3 is a side elevational view of a riding-type lawn mowing machine having a hydraulically operated power transmission apparatus according to another embodiment of the present invention.
Figure 4:
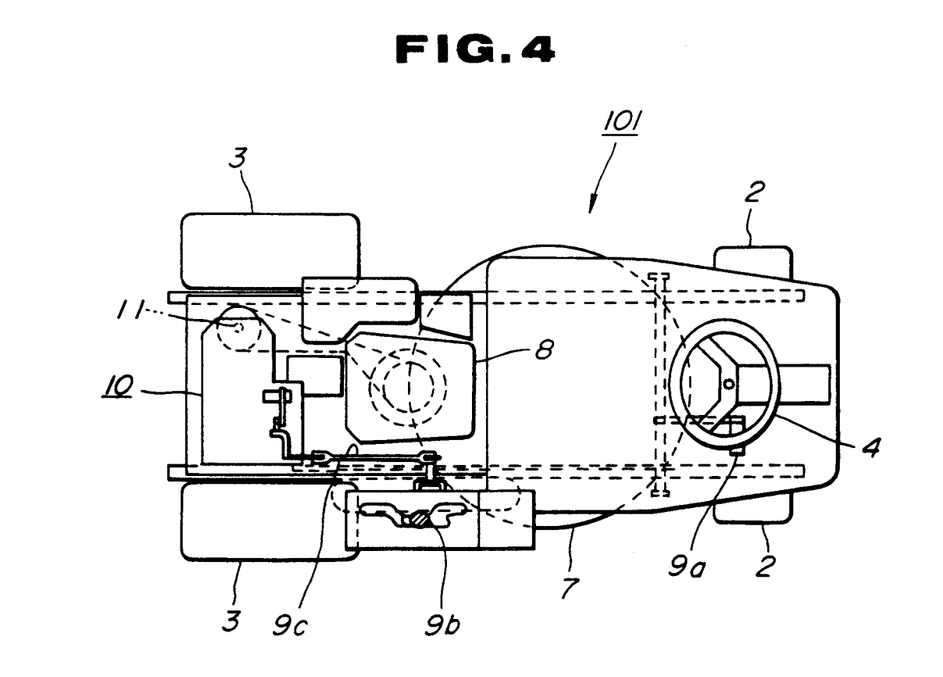
FIG. 4 is a plan view of the riding-type lawn mowing machine shown in FIG. 3, with a body omitted from illustration.

As shown in FIG. 3, a cutter housing 7 is disposed below a body 6 of a riding-type lawn mowing machine 101, and an engine 8 and a hydraulically operated power transmission apparatus 10 are disposed below a driver's seat 5.

Power from the engine 8 is transmitted through the power transmission apparatus 10 to rear road wheels 3, and is also transmitted to rotate a cutter blade 7a in the cutter housing 7, so that the mowing machine 101 cuts off grass while moving at a low speed.

The mowing machine 101 also has a brake pedal 9a, a shift lever 9b for controlling the power transmission apparatus 10 to change the speed and direction of travel of the mowing machine 101, and a link mechanism 9c operatively interconnecting the shift lever 9b and the power transmission apparatus 10.

Figure 5:
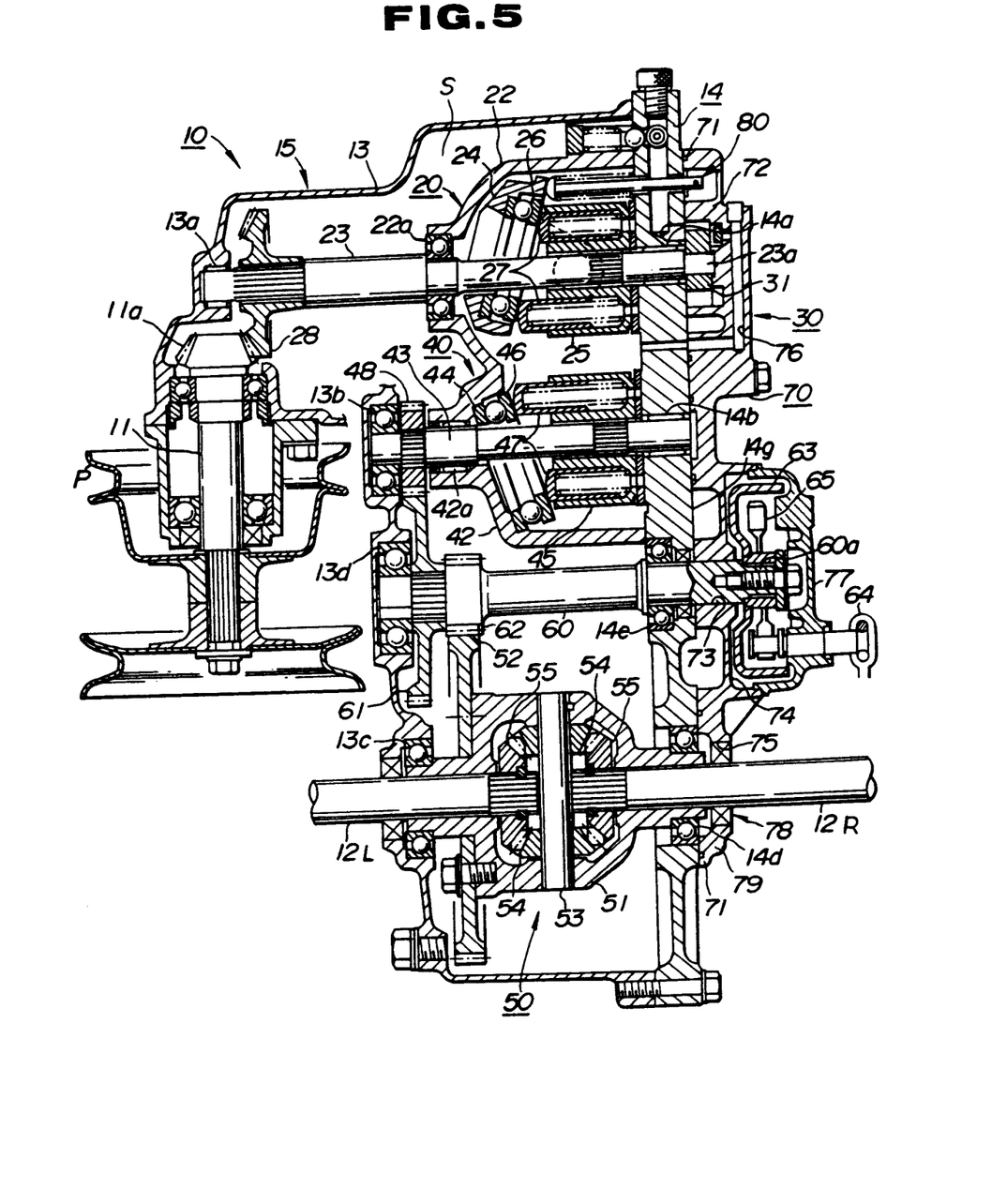
FIG. 5 is an enlarged cross-sectional view of the hydraulically operated power transmission apparatus on the mowing machine shown in FIG. 3.

As shown in FIG. 5, a cover 70 is attached to the flat outer attachment surface 14g of the base plate 14 with a sealing member 71 such as an O-ring interposed therebetween.

The cover 70 is in the form of a unitary block which comprises a charging pump housing 72 which accommodates the rotor 31 of the oil charging pump 30, a brake housing 74 having a hole 73 through which the countershaft 60 extends, and an output shaft sealing portion 79 having a hole 75 through which the output shaft 12R extends.

The charging pump housing 72 of the cover 70 has an oil inlet passage 76 defined therein and providing communication between the closed space S in the transmission case 15 and the charging pump 30. A lid 77 is attached to the brake housing 74. A sealing member 78 is fitted in the hole 75. The sealing member 78 is preferably in the form of an oil seal, and seals between the output shaft 12R and the cover 70 to prevent oil from leaking from within the closed space S.

In this embodiment, the righthand end of the differential case 51 is rotatably supported in the base plate 14 by the bearing 14d mounted directly in the base plate 14.

To assemble the power transmission apparatus 10 shown in FIG. 5, the hydraulic pump 20, the hydraulic motor 40, the countershaft 60, and the differential mechanism 50 are mounted on the base plate 14 in the same manner as with the first embodiment, and then they are covered with the casing 13 which is subsequently joined to the base plate 14.

Then, the rotor 31 of the charging pump 30 is mounted on the projecting end 23a of the pump drive shaft 23, and thereafter the countershaft 60 is inserted through the hole 73. The cover 70 is mounted on the outer attachment surface 14g of the base plate 14 through the sealing member 71 while the output shaft 12R is inserted through the seal member 78.

The charging pump 30 and the bearing 14*d* for the output shaft 12R can be inspected and easily serviced when the single cover 70 is removed.

The hydraulically operated power transmission apparatus includes a swash plate stabilizer 80.

The swash plate stabilizer 80 will be described below with reference to FIGS. 6 through 8.

Figure 6:
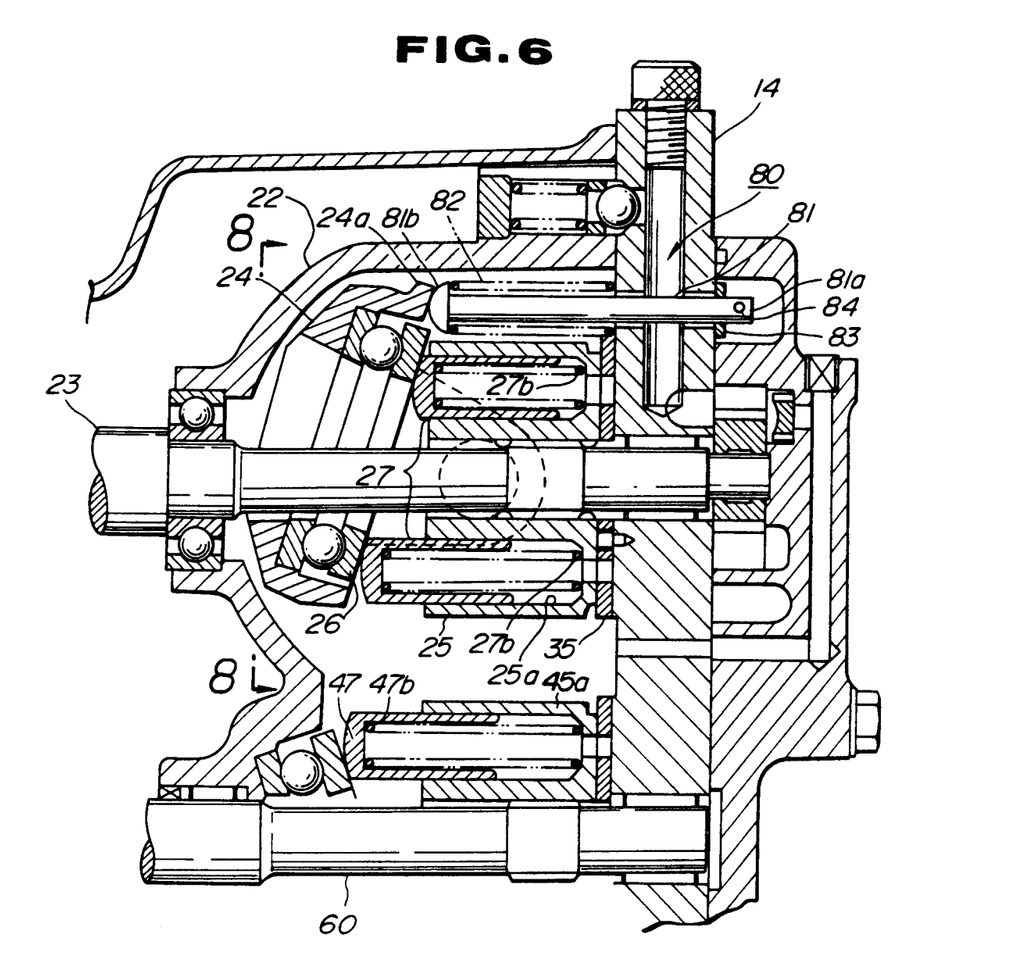
FIG. 6 is a fragmentary cross-sectional view showing a swash plate stabilizer in the hydraulically operated power transmission apparatus shown in FIG. 5.

As shown in FIG. 6, the swash plate stabilizer 80 comprises a pusher rod 81 extending through the base plate 14 parallel to the pump drive shaft 23, and a spring 82 for normally urging the pusher rod 81 toward the pump swash plate 24.

The pusher rod 81 has an inner end 81*b* held against an upper edge 24*a* of the swash plate 24 and an outer end 81*a* supporting a washer 83 and a pin 84 for limiting the movement of the pusher rod 81 through the base plate 14 to the left. The pin 84 is positioned such that when the swash plate 24 is turned counterclockwise (FIG. 6) into a neutral position in which the thrust bearing 26 lies parallel to the base plate 14, the inner end 81*b* of the pusher rod 81 is slightly spaced from the swash plate 24. The washer 83 and the pin 84 may be replaced with other appropriate retaining means such as a lock nut on the outer end 81*a* for keeping the pusher rod 81 from removal.

Figure 8:
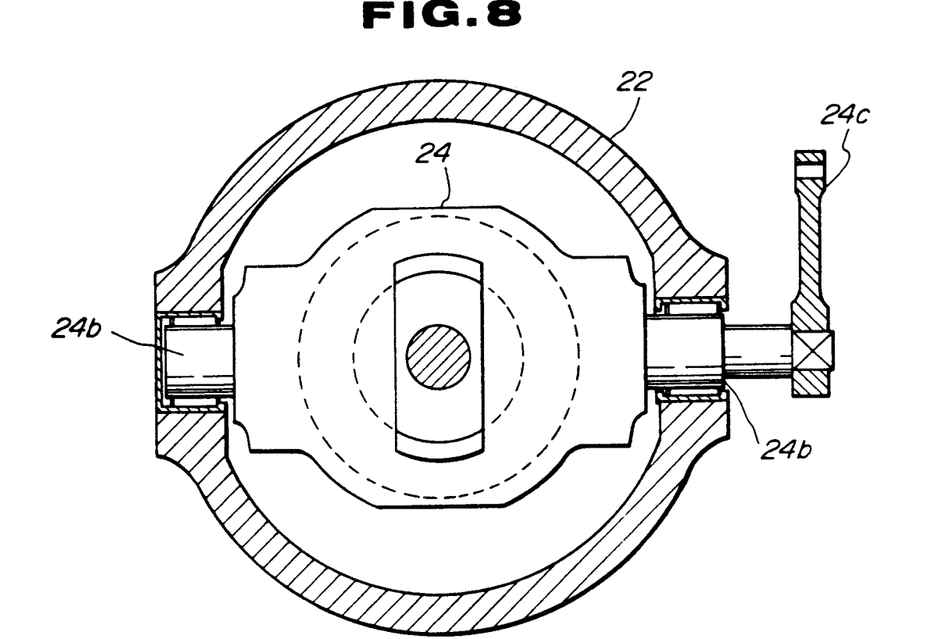
FIG. 8 is a cross-sectional view taken along lines 8—8 of FIG. 6.

As shown in FIG. 8, pivot shafts 24*b* attached to the swash plate 24 are rotatably supported in the pump case 22, and a lever 24*c* is fixed to one of the pivot shafts 24*b*. Therefore, the swash plate 24 can be tilted by angularly moving the lever 24*c*. The lever 24*c* is coupled to the link mechanism 9*c* shown in FIG. 3, so that the swash plate 24 can be tilted under remote control by operating the shift lever 9*b*.

Figure 9:
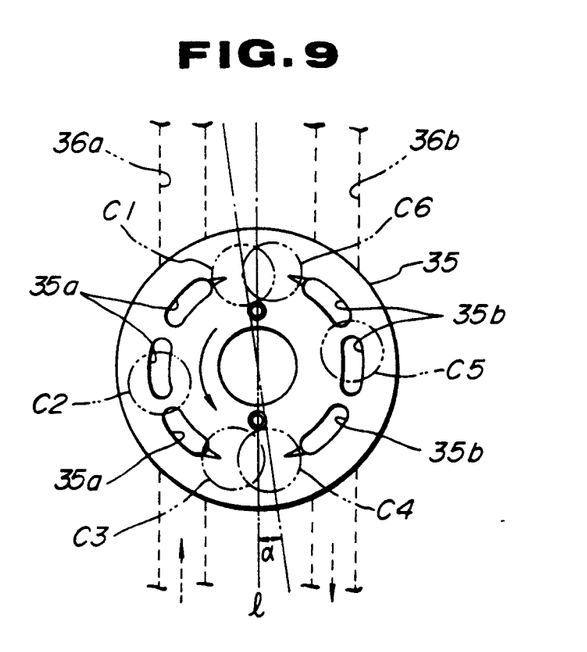
FIG. 9 is a front elevational view of a cylinder plate, as viewed from a swash plate, interposed between a cylinder block and a base plate.

FIG. 9 shows a cylinder plate 35, as viewed from the side of the swash plate 24, interposed between the cylinder block 25 and the base plate 14 shown in FIG. 6. The cylinder plate 35 has first and second ports 35*a*, 35*b* defined therein and held in communication with first and second hydraulic passages 36*a*, 36*b*, respectively, which are defined in the base plate 14.

When the cylinder block 25 rotates counterclockwise, for example, with the pump drive shaft 23 with respect to the cylinder plate 35, the cylinders 25*a* move successively from a position C1 to a position C2 to a position C3 to a position C4 to a position C5 to a position C6 back to the position C1. At this time, the pistons 27 in the respective cylinders 25*a* move in abutting engagement with the slanted surface of the swash plate 24. More specifically, when the pistons 27 are positioned on the lefthand side of the vertical central line 1 of the cylinder plate 35, they move forwardly out of the cylinders 25*a*, and when the pistons 27 are positioned on the righthand side of the vertical central line 1, they move rearwardly back into the cylinders 25*a*.

The cylinders 25*a* start drawing oil from the first hydraulic passage 36*a* in the position C1, and stop drawing oil in the position C3. The cylinders 25*a* start discharging oil into the second hydraulic passage 36*b* in the position C4 and stop discharging oil in the position C6.

Working oil supplied under pressure from the hydraulic pump 20 through the second hydraulic passage 36*b* operates to move the pistons 47 forwardly out of the cylinders 45*a*. Working oil discharged from the pistons 47 returns through the first hydraulic passage 36*a* to the hydraulic pump 20. Since the pistons 47 move while their ends are sliding against the swash plate 44, the cylinder block 45 is rotated to rotate the motor output shaft 43.

The rate at which the working oil discharged from the hydraulic pump 20 flows can be changed by varying the angle of inclination of the swash plate 24 for thereby varying the ratio between the rotational speeds of the pump drive shaft 23 and the motor output shaft 43.

As shown in FIG. 6, the pistons 27, 47 fitted in the respective cylinders 25*a*, 45*a* of the hydraulic pump 20 and the hydraulic motor 40 are resiliently urged to move forwardly out of the cylinders under the bias of springs. 27*b*, 47*b*.

The piston 27 in the position C4 pushes back the swash plate 24 under a large force since the cylinder 25*a* housing that piston 27 communicates with one of the ports 35*b* and the pressure of oil in the cylinder 25*a* is high. The piston 27 in the position C4 also pushes the swash plate 24 under a large force since the cylinder 25*a* housing that piston 27 does not fully communicate with one of the ports 35*a* and the high oil pressure is kept in the cylinder 25*a*.

Therefore, those pistons 27 subjected to a larger pressure and those pistons 27 subjected to a smaller pressure are positioned, not horizontally symmetrically with respect to the vertical line 1, but symmetrically with respect to a straight line which is angularly displaced from the line 1 by an angle $\alpha$. The swash plate 24 undergoes a couple of forces tending to move the swash plate 24 into the neutral position in the counterclockwise direction in FIG. 6. Accordingly, the lever 24*c* places the link mechanism 9*c* under tension.

Figure 7:
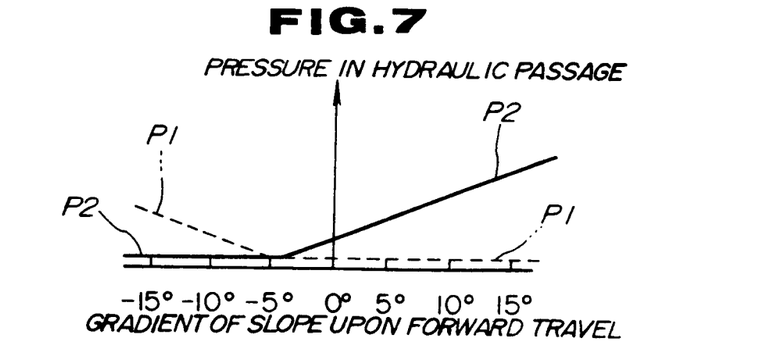
FIG. 7 is a graph showing the relationship between the gradient of a sloping road and the pressure in a hydraulic passage.

When the mowing machine runs on a flat surface, a pressure P1 in the first hydraulic passage 36*a* is lower than a pressure P2 in the second hydraulic passage 36*b*, as shown in FIG. 7. The couple of forces applied to the swash plate 24 and the tension acting on the link mechanism 9*c* are balanced, and the swash plate 24 is stably held in position, thus stabilizing the speed of travel of the mowing machine. When the mowing machine runs uphill, the load on the motor output shaft 43 is increased, and the pressure P2 in the second hydraulic passage 36*b* is increased to keep up with the increase in the load on the motor output shaft 43. The pressure applied to the swash plate 24 by the piston 27 in the position C6 is increased, so that the swash plate 24 is tilted more strongly toward the neutral position. The link mechanism 9*c* is thus strongly tensioned, and the swash plate 24 remains continuously stably held in position, with the result that the speed of travel of the mowing machine is stabilized.

When the mowing machine runs downhill, the motor output shaft 43 is forcibly driven by the road wheels 3. Therefore, the pressure P1 in the first hydraulic passage 36*a* becomes higher than the pressure P2 in the second hydraulic passage 36*b*, tending to tilt the swash plate 24 in a direction away from the neutral position. The link mechanism 9*c* is liable to be released from the tension, and the swash plate 24 tends to wobble within the play between itself and the link mechanism 9*c*.

At this time, the pusher rod 81 of the swash plate stabilizer 80 pushes back the swash plate 24 toward the neutral position and tensions the link mechanism 9*c*. Accordingly, the swash plate 24 is stably held in position, and the speed of travel of the mowing machine remains stable.

Figure 10:
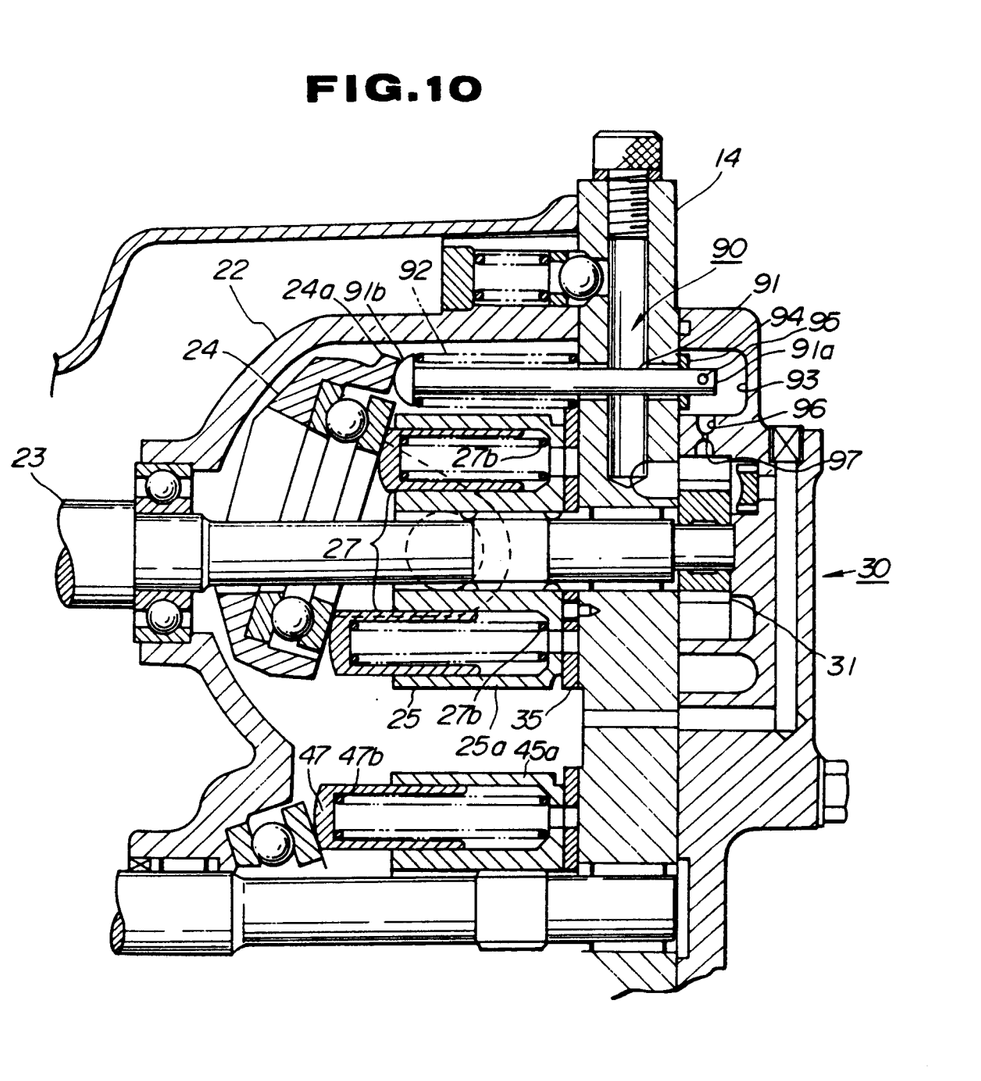
FIG. 10 is an enlarged cross-sectional view of another swash plate stabilizer.

FIG. 10 shows another swash plate stabilizer. The swash plate stabilizer, generally denoted at 90, comprises a pusher rod 91 extending through the base plate 14 parallel to the pump drive shaft 23, a spring 92 for normally urging the pusher rod 91 toward the swash plate 24, and a hydraulic pressure changer 93 housing the outer end 91a of the pusher rod 91a and supplied with the hydraulic pressure from the charging pump 30. The hydraulic pressure chamber 93 communicates with the charging pump 30 through a communication passage 96 having an orifice 97 which provides a damping effect on the pusher rod 91.

The inner end 91b of the pusher rod 91 is hold in abutment against the upper edge 24a of the swash plate 24. The pusher rod 91 is stopped in its movement toward the swash plate 24 by a washer 94 and a pin 95 on the outer end 91a.

When the mowing machine with the swash plate stabilizer of FIG. 10 runs downhill, the swash plate 24 undergoes a couple of forces tending to move the swash plate 24 away from the neutral position as described above. However, the pusher rod 91 pushes back the swash plate 24 toward the neutral position. More specifically, the pusher rod 91 pushes back the swash plate 24 under the sum of the resilient force of the spring and the force produced as the product of the hydraulic pressure and the cross-sectional shape of the rod end 91a, so that the swash plate 24 is prevented from wobbling and the link mechanism 9c is kept under tension.

In FIGS. 6 and 10, when the swash plate 24 is in the neutral position, the ends 81b, 91b of the pusher rods 81, 91 are positioned out of contact with the swash plate 24, and do not impair the force to keep the swash plate 24 in the neutral position.

In the above embodiments, the swash plate stabilizer is associated with the hydraulic pump. However, the hydraulic motor may comprise a tiltable-swash-plate axialpiston motor, and the swash plate stabilizer may be associated with the swash plate of the motor.

With the present invention, as described above, the power transmission apparatus can easily be assembled and disassembled in a reduced number of steps since all major components are installed on a side surface (inner attachment surface) of the base plate. The transmission case is composed of the base plate and the casing covering the side surface of the base plate, while the hydraulic motor, the hydraulic pump, and the differential mechanism are mounted on the inner attachment surface of the base plate. Therefore, only the inner attachment surface is required to be machined highly accurately, whereas the other, (outer) side surface may be machined with lower accuracy. Thus, the cost of manufacture of the power transmission apparatus can be lowered. Since the hydraulic pump, the hydraulic motor, and the differential mechanism are disposed closely in the space in the transmission case, the power transmission apparatus is compact as a whole. The width of the power transmission apparatus across which the output shafts 12R, 12L extend is reduced, so that the power transmission apparatus may be installed on a motor vehicle having a small tread.

The single cover 70 which covers the other side surface (outer attachment surface) of the base plate serves as a housing of the charging pump and the brake mechanism and provides a seal for one of the output shafts. This arrangement also allows the power transmission apparatus to be assembled, disassembled, and reassembled easily, and also maintained and inspected efficiently.

The swash plate stabilizer is of a simple construction which includes a pusher rod for pushing back the tiltable swash plate toward the neutral position. The swash plate stabilizer is effective in preventing the swash plate from wobbling and in stabilizing the speed of travel of the motor vehicle which incorporates the power transmission apparatus.

Although there have been described what are at present considered to be the preferred embodiments of the present invention, it will be understood that the invention may be embodied in other specific forms without departing from the essential characteristics thereof. The present embodiments are, therefore, to be considered in all aspects as illustrative, and not restrictive. The scope of the invention is indicated by the appended claims rather than by the foregoing description.

We claim:

1. A hydraulically operated power transmission apparatus for transmitting the output power from a power source at a selected speed ration, comprising:
   a casing having an opening in one end thereof;
   a base plate attached to said one end of said casing in covering relation to said opening, said casing and said base plate jointly serving as a transmission case defining a closed space therein;
   a hydraulic pump having a pump drive shaft adapted to be operatively coupled to the power source, said hydraulic pump being disposed in said closed space;
   a hydraulic motor having a motor output shaft and drivable by a hydraulic pressure generated by said hydraulic pump, said hydraulic motor being disposed in said closed space;
   a pair of output shafts extending through said casing and said base plate, respectively, and disposed coaxially with each other;
   a differential mechanism disposed in said closed space and operable by said motor output shaft, said differential mechanism being coupled to said output shafts; and
   said hydraulic pump, said hydraulic motor, and said differential mechanism being mounted on said base plate, and said pump drive shaft, said motor output shaft, and said differential mechanism having ends rotatably supported by said base plate and opposite ends rotatably supported by said casing.

2. A hydraulically operated power transmission apparatus according to claim 1, further including as countershaft transmission mechanism for transmitting rotation of said motor output shaft to said differential mechanism, said countershaft transmission mechanism being disposed between said motor output shaft and said differential mechanism.

3. A hydraulically operated power transmission apparatus according to claim 2, wherein said countershaft transmission mechanism comprises a speed reducer mechanism having a countershaft rotatably supported by said base plate and said casing and a train of speed reducer gears mounted on said countershaft and operatively coupled to said motor output shaft and said differential mechanism, respectively.

4. A hydraulically operated power transmission apparatus according to claim 1, further including an inner case having an opening in one end thereof and covering said hydraulic pump and said hydraulic motor, said one end of said inner case being mounted on said base plate.

5. A hydraulically operated power transmission apparatus according to claim 1, further including an input shaft having one end projecting from said transmission case for receiving the output power from the drive source, a rotational axis of said input shaft being disposed at an angle to a rotational axis of said pump drive shaft, and a direction changing mechanism for transmitting rotation of said input shaft to said pump drive shaft while changing the direction of the rotation.

6. A hydraulically operated power transmission apparatus according to claim 1, wherein said pump drive shaft, said motor output shaft, and said output shafts lie perpendicularly to said base plate and parallel to each other.

7. A hydraulically operated power transmission apparatus according to claim 1, wherein said hydraulic pump further includes a swash plate disposed for tilting movement with respect to said base plate, and said transmission apparatus further includes a swash plate stabilizer for pushing back said swash plate toward a neutral position.

8. A hydraulically operated power transmission apparatus according to claim 7, wherein said swash plate stabilizer comprises a pusher rod having an end engageable with said swash plate and extending parallel to said pump drive shaft, said pusher rod being axially movably supported by said base plate, a spring for normally urging said pusher rod toward said swash plate, and a stop member attached to an opposite end of said pusher rod for limiting axial movement of said pusher rod toward said swash plate.

9. A hydraulically operated power transmission apparatus according to claim 8, further including an oil charging pump drivable by said pump drive shaft for supplying working oil to said hydraulic pump, said swash plate stabilizer having a hydraulic pressure chamber housing said opposite end of said pusher rod for applying a hydraulic pressure produced by said oil charging pump to said opposite end of said pusher rod.

10. A hydraulically operated power transmission apparatus according to claim 1, wherein said hydraulic pump includes a pump cylinder block formed separately from and connected to said pump drive shaft, said pump cylinder block is adapted to be driven by said pump drive shaft, and said hydraulic motor includes a motor cylinder block formed separately from and connected to said motor output shaft, said motor output shaft is adapted to be driven by said motor cylinder block.

11. A hydraulically operated power transmission apparatus according to claim 10, wherein said pump cylinder block is splined over said pump drive shaft and said motor cylinder block is splined over said motor output shaft.

12. A hydraulically operated power transmission apparatus for transmitting the output power from a power source at a selected speed ration, comprising:
 a base plate having opposite attachment surfaces,
 a hydraulic pump having a pump drive shaft adapted to be operatively coupled to the power source, said hydraulic pump being mounted on one of said attachment surfaces;
 a hydraulic motor having a motor output shaft and drivable by a hydraulic pressure generated by said hydraulic pump, said hydraulic motor being mounted on said one attachment surface;
 a differential mechanism operable by said motor output shaft;
 a countershaft for transmitting rotation of said motor output shaft to said differential mechanism, said countershaft being disposed between said motor output shaft and said differential mechanism;
 said pump drive shaft, said motor output shaft, said differential mechanism, and said countershaft having ends rotatably supported by said base plate; and
 a brake mechanism for braking said countershaft, said brake mechanism being mounted on the other attachment surface of said base plate.

13. A hydraulically operated power transmission apparatus according to claim 12, further including a casing having an opening in one end thereof and covering said hydraulic pump, said hydraulic motor, said countershaft, and said differential mechanism, said one end of said casing being mounted on said one attachment surface.

14. A hydraulically operated power transmission apparatus according to claim 13, wherein said pump drive shaft, said motor output shaft, said countershaft, and said differential mechanism have opposite ends rotatably supported by said casing, and the transmission apparatus further including output shafts extending through said base plate and said casing, respectively, said differential mechanism being coupled to said output shafts.

15. A hydraulically operated power transmission apparatus for transmitting the output power from a power source at a selected speed ratio, comprising;
 a casing having an opening in one end thereof;
 a base plate having inner and outer attachment surfaces and attached to said one end of said casing in covering relation to said opening, said casing and said base plate jointly serving as a transmission case defining a closed space therein;
 a hydraulic pump having a pump drive shaft adapted to be operatively coupled to the power source. Said hydraulic pump being disposed in said closed space and mounted on said inner attachment surface;
 a hydraulic motor having a motor output shaft and drivable by a hydraulic pressure generated by said hydraulic pump, said hydraulic motor being disposed in said closed space and mounted on said inner attachment surface;
 a pair of output shafts extending through said casing and said base plate, respectively, and disposed coaxially with each other;
 a differential mechanism disposed in said closed space and operable by said motor output shaft, said differential mechanism being mounted on said inner attachment surface;
 said pump drive shaft, said motor output shaft, and said differential mechanism having ends rotatably supported by said base plate and opposite ends rotatably supported by said casing;
 an oil charging pump drivable by said pump drive shaft for supplying working oil to said hydraulic pump, said oil charging pump being mounted on said outer attachment surface; and
 a cover mounted on said outer attachment surface and having a charging pump housing accommodating said oil charging pump therein and an output shaft sealing member through which one of said output shafts extends, said output shaft sealing member providing a seal between said one output shaft and said base plate.

16. A hydraulically operated power transmission apparatus according to claim 15, further including a countershaft for transmitting rotation of said motor output shaft to said differential mechanism, said countershaft being disposed between said motor output shaft and said differential mechanism.

17. A hydraulically operated power transmission apparatus according to claim 16, further including a brake mechanism for braking said countershaft, said brake mechanism being mounted on said outer attachment surface, said cover having a brake housing accommodating said brake mechanism therein.

18. A hydraulically operated power transmission apparatus comprising:
   a base plate;
   a rotatable shaft rotatably supported by said base plate;
   a cylinder block rotatable with said rotatable shaft;
   a plurality of cylinders defined in said cylinder block concentrically around said rotatable shaft;
   a swash plate disposed for tilting movement with respect to said base plate;
   a plurality of pistons fitted respectively in said cylinders and reciprocally movable in slidable abutment against said swash plate; and
   a swash plate stabilizer supported by said base plate and engageable with said swash plate for pushing said swash plate toward a neutral position thereof;
   an inner end of said stabilizer being slightly spaced from said swash plate when the swash plate is in said neutral position; and
   said cylinder block being formed separately from and connected to said rotatable shaft.

19. A hydraulically operated power transmission apparatus according to claim 18, wherein said swash plate stabilizer comprises a pusher rod having an end engageable with said swash plate and extending parallel to said rotatable shaft, said pusher rod being axially movably supported by said base plate, a spring for normally urging said pusher rod toward said swash plate, and a stop member attached to an opposite end of said pusher rod for limiting axial movement of said pusher rod toward said swash plate.

20. A hydraulically operated power transmission apparatus according to claim 19, further including an oil charging pump drivable by said rotatable shaft for supplying working oil to said cylinders, said swash plate stabilizer having a hydraulic pressure chamber housing said opposite end of said pusher rod for applying a hydraulic pressure produced by said oil charging pump to said opposite end of said pusher rod.

* * * * *

UNITED STATES PATENT AND TRADEMARK OFFICE
CERTIFICATE OF CORRECTION

PATENT NO. : 5,230,519
DATED : July 27, 1993
INVENTOR(S) : Nishimura et al.

It is certified that error appears in the above-indentified patent and that said Letters Patent is hereby corrected as shown below:

Column 1, line 8, change "07/155,966" to --07/155,996--.

Column 2, line 51, change "lines" to --line--.

Column 3, line 35, change "gear" to --gears--.

Column 8, line 13, delete the period (first occurrence).

Column 9, line 11, change "hold" to --held--;
Column 9, line 50, delete the comma (second occurrence).

Column 10, line 48 (claim 2, line 2), change "as" to --a--.

Column 11, line 55 (claim 12, line 3), change "ration" to --ratio--.

Column 12, lines 35-36 (claim 15, lines 11-12), change "source. Said" to --source, said--.

Signed and Sealed this

Twenty-ninth Day of March, 1994

Attest:

BRUCE LEHMAN

Attesting Officer

Commissioner of Patents and Trademarks